United States Patent [19]

Werner

[11] Patent Number: 5,282,652
[45] Date of Patent: Feb. 1, 1994

[54] LINED PIPE JOINT AND SEAL

[75] Inventor: Robert M. Werner, Independence, Kans.

[73] Assignee: Werner Pipe Service, Inc., Independence, Kans.

[21] Appl. No.: 780,481

[22] Filed: Oct. 22, 1991

[51] Int. Cl.⁵ .............................................. F16L 9/14
[52] U.S. Cl. ...................................... 285/55; 285/110; 285/355; 285/924; 277/116.8; 277/152; 277/29
[58] Field of Search .................... 285/10, 55, 110, 355, 285/370, 371, 924; 277/116.8, 152, 29; 137/798, 854

[56] References Cited

U.S. PATENT DOCUMENTS

| | | | |
|---|---|---|---|
| 317,408 | 5/1885 | Moeser | 285/10 |
| 343,246 | 6/1886 | Lee | 285/10 |
| 924,039 | 6/1909 | Clark | 285/10 |
| 1,188,485 | 6/1916 | Pruyn . | |
| 1,816,293 | 7/1931 | Oberhuber | 285/110 X |
| 2,572,058 | 10/1951 | Sarosdy | 285/110 X |
| 2,746,486 | 5/1956 | Gratzmuller | 285/110 X |
| 2,901,269 | 8/1959 | Rickard | 285/39 |
| 2,915,322 | 12/1959 | Dunlop | 285/10 |
| 2,932,531 | 4/1960 | Briechle | 285/110 |
| 3,202,562 | 8/1965 | Lang et al. | 285/55 X |
| 3,266,821 | 8/1966 | Safford | 285/40 |
| 3,355,142 | 11/1967 | Kammerer, Jr. et al. | 285/110 X |
| 3,521,913 | 8/1968 | Verhein et al. | 285/109 |
| 3,537,731 | 11/1970 | Reddy | 285/110 |
| 3,955,834 | 5/1976 | Ahlrot | 285/110 |
| 4,182,519 | 1/1980 | Wilson | 277/207 A |
| 4,318,547 | 3/1982 | Ericson | 277/207 A |
| 4,400,019 | 8/1983 | Fruck | 285/55 |
| 4,507,842 | 4/1985 | Werner | 29/451 |
| 4,541,655 | 9/1985 | Hunter | 285/55 |
| 4,549,752 | 10/1985 | Nimke et al. | 285/55 |
| 4,664,421 | 5/1987 | Jones | 285/110 |
| 4,709,946 | 12/1987 | Hunter | 285/55 |
| 4,773,479 | 9/1988 | Guy | 166/242 |
| 4,848,807 | 7/1989 | Christianson | 285/110 |
| 4,852,655 | 8/1989 | Guy | 166/380 |
| 4,856,828 | 8/1989 | Kessler et al. | 285/334.1 |
| 4,921,258 | 5/1990 | Fournier et al. | 277/29 |
| 4,962,958 | 10/1990 | Takei | 285/55 |

FOREIGN PATENT DOCUMENTS

| | | | |
|---|---|---|---|
| 275055 | 7/1988 | European Pat. Off. | 285/110 |
| 1068068 | 10/1959 | Fed. Rep. of Germany | 285/55 |
| 1190752 | 4/1965 | Fed. Rep. of Germany | 285/55 |
| 2315870 | 10/1974 | Fed. Rep. of Germany | 137/854 |
| 37517 | 9/1914 | Sweden | 285/55 |

Primary Examiner—Eric K. Nicholson
Assistant Examiner—Heather Chun
Attorney, Agent, or Firm—Dougherty, Hessin, Beavers & Gilbert

[57] ABSTRACT

A lined pipe joint with an improved collar seal and pipe lining end therefor. The pipe lining end is disposed at the end of the liner in the pipe. The lining end is adapted to shoulder against grouting material which holds the liner in place such that longitudinal contraction of the liner is prevented. The lining end also has a tapered bore therein which compensates for any inward deflection of the pipe section when threadingly engaged with a pipe fitting. The collar seal fits within the end of a pipe section which is to be connected to a pipe fitting. A sealing check valve on the collar seal provides sealing between the collar seal and the pipe section when pressure within the pipe section is greater than pressure outside the collar seal. The sealing check valve allows relief of pressure outside the collar seal into the pipe section when the pipe section is depressurized, so that damaging inward deflection of the pipe liner is prevented. A method of assembling the pipe joint is also disclosed.

32 Claims, 4 Drawing Sheets

LINED PIPE JOINT AND SEAL

BACKGROUND OF THE INVENTION

1. Field of the Invention

This invention relates to lined pipe joints. More particularly, the preferred embodiment of the invention relates to a pipe joint collar seal having a sealing check valve means thereon for sealing against a liner of a pipe and providing relief of pressure from outside the lining to inside The invention also relates to a pipe joint lining end which facilitates operation of the collar seal and also prevents longitudinal contraction of the pipe lining.

2. Description of the Prior Art

The concept of employing a lined pipe in an oil or gas well which is to be treated with or handle highly corrosive fluids is known. Thus, it is known to use a lined steel pipe to deliver acids and the like to a desired depth in a gas or oil well. The pipe liners may be made of plastic, stainless steel, or other corrosion resistant materials. It is also well known that such pipes or tubing involve the assembling of many shorter pipe sections wherein each pipe joint created at the junction of two pipe sections or of a pipe section and a fitting represents a potential weak point and region susceptible to acid or corrosive attack. Thus, to extend the life of the lined pipe, various gaskets or pipeline couplings have been proposed with varying degrees of success, yet none have proven to be entirely reliable. For example, the use of an internal gasket to be held under compression between the two respective pipe ends seems to be a reasonable solution. However, in practice, the repeated assembling and disassembling of the pipe under oil field conditions quickly leads to a high frequency of pipe joint failure for compressive gasket type pipe couplings Thus, the need for a reliable yet easily installed and reusable lined pipe joint, particularly for oil field applications, exists.

One solution to this problem is provided in U.S. Pat. No. 4,507,842 to Werner, assigned to the assignee of the present invention. This patent discloses an improved method for sealing and protecting a lined pipe joint which solves many problems associated with using a lined pipe within an oil or gas well in order to deliver a highly corrosive fluid to a selected subterranean strata. In this patent, a plastic collar seal is used which is placed in the interior of a pipe joint formed between first and second externally threaded lined pipe sections which are to be held together by an internally threaded pipe collar. The collar seal is a hollow, open-ended, cylindrical plastic apparatus presized to concentrically fit within the liner of the sections of lined pipe with minimum clearance. The open ends of the collar seal are internally beveled or chamfered, and the collar seal is equipped with a sealing means, such as O-rings, on each of the ends.

This prior art collar seal is further provided with an external ledge or ridge molded on the collar seal between the O-rings, and the ledge is adapted to fit within the internally threaded collar and rest on the end of one of the lined pipes The ledge is also referred to as a "no-go" ring. This ledge is positioned such that the distance from at least one end of the collar seal to the ledge exceeds the length of the unengaged portion of the threaded collar.

This apparatus has worked well, but the O-ring seals do not allow for relief of pressure from outside the liner in the event that the pipe is depressurized. That is, gas can migrate through plastic lining in the pipe causing pressure to build up and be trapped outside the lining. If the interior of the pipe is depressurized, the pressure outside of the lining can cause the lining to implode or be deformed inwardly which is an undesirable result. The O-rings seals on the prior art collar seal help keep the pressure outside the lining. The collar seal of the present invention comprises a sealing check valve means which prevents fluid pressure inside the pipe from leaking outwardly, but which will allow any pressure which accumulates outside the lining, and which enters the coupling or collar at the joint, to be relieved and flow into the interior of the pipe if the pipe is depressurized. Thus, collapse of the pipe lining in such circumstances is prevented.

Another problem which can occur in prior art plastic lined pipes is that the plastic pipe liners can shrink when exposed to high temperatures, thus resulting in the pipe liner contracting longitudinally within the pipe This can sometimes cause difficulties. For example, the prior lined pipes known to the inventor relied upon flared ends having the same thickness as the liner to anchor the liner in the pipe. When sections of such plastic lined pipe lay in the sun, they can be heated enough to cause the pipe liner to shrink and the flared ends to break. Alternate cooling and warming periods over time can then result in the unanchored pipe liner "walking out" of the metal pipe portion. When this occurs, it is virtually impossible to reposition the pipe liner properly, and so such lengths of pipe are no longer usable. Also, the flared ends of the liners of prior lined pipe are vulnerable to breakage during handling and prevent rethreading of threaded pipe, i.e., the ends must be cut off a section of pipe to rethread it and doing so cuts the flared ends off the liner, thereby eliminating the anchoring of the liner in the pipe.

The present invention solves these problems by providing a pipe lining end which is bonded to the pipe lining or integrally formed therewith and abuts grouting between the pipe lining and pipe metal outer portion. Since the grouting material does not shrink significantly relative to the outer pipe, the plastic pipe lining cannot contract longitudinally. The preferred lining end and its abutment with the grouting material are preferably much stronger than the tensile strength of the liner so that the lining end will not break if the liner tries to contract. Also, preferably, the abutment of the pipe lining end with the grout is spaced longitudinally inside the pipe from the open end of the pipe and the lining end extends from the abutment to the open end of the pipe which allows the pipe to be rethreaded Since the pipe lining cannot contract, it cannot "walk" out of the metal pipe portion or expose the ends of the outer pipe.

SUMMARY OF THE INVENTION

The present invention relates to pipe joints of the type wherein a lined pipe section is engaged with a pipe fitting. The pipe joint may comprise a pipe section with an improved lining end and an improved collar seal which provides sealing engagement with the pipe section while preventing a pressure buildup which could implode the pipe lining in the event of pipe depressurization. The pipe fitting itself is of a kind known in the art.

The collar seal of the present invention comprises a cylindrical tube having an outer surface and a central opening defined therethrough, a ridge extending radially outwardly from the outer surface and positionable adjacent to an end of the pipe section, and sealing check valve means for sealing between the tube and the pipe section when pressure within the pipe section is greater than pressure outside the tube and allowing relief of the pressure outside the tube when the pressure outside the tube is greater than the pressure within the pipe section.

The sealing check valve means may be integrally formed with the tube of the collar seal or may be a separate component therefrom In the preferred embodiment, the sealing check valve means comprises a flexible and resilient lip extending from the tube toward an inner surface of the pipe section. The lip extends angularly in a direction away from the ridge on the collar seal.

The flexible lip is preferably inherently biased toward the pipe section when deflected into engagement therewith A radially outer edge of the lip has a free diameter greater than an outer surface of the tube and also greater than a diameter of an inner surface of the pipe lining.

In one embodiment, the sealing check valve means further comprises a shoulder extending radially inwardly from the outer surface of the tube and a second shoulder extending radially inwardly from the outer surface of the tube and spaced from the first shoulder. The lip is disposed between these shoulders. The second shoulder is preferably a tapered shoulder, and the lip is preferably substantially parallel to this second shoulder.

The improved pipe section of the present invention may be generally said to comprise an outer portion and a liner disposed in the outer portion and having an outer surface spaced radially inwardly from the outer portion. Grouting material is dispose between the outer portion and the liner for holding the liner in place.

The pipe section further comprises the improved lining end of the present invention. The lining end itself comprises a shoulder abutting the grouting material such that longitudinal contraction of the liner within the outer portion is prevented. Preferably, the lining end has an outer surface spaced radially inwardly from the outer portion. Additional grout may be disposed between the outer portion and the lining end to hold the lining end in place.

The lining end may be integral with the liner or it may be a separate component therefrom. If the lining end is separate, it preferably comprises a sleeve portion disposed around an end of the liner and an end portion extending from the sleeve portion An end of the sleeve portion opposite the end portion forms the shoulder which abuts the grouting material Preferably, the separate lining end is chemically bonded or otherwise affixed to the liner. Normally a lining end will be provided at each open end of the pipe section and liner, e.g., a straight section of lined pipe will normally have a liner end at both open ends of the pipe section and liner.

When the pipe section is engaged with the pipe fitting, there may be slight radially inward deflection of the pipe section The lining end preferably has an outwardly tapered bore therein which is sized such that a minimum diameter of the tapered bore after any deflection is at least as large as an inside diameter of the liner. That is, the tapered bore compensates for any deflection of the pipe sections due to engagement with the pipe fitting. The length of the tapered bore is preferably substantially the same as the length of the external pipe thread on the outer portion of a threaded pipe section.

The pipe fitting may be a pipe coupling, and the pipe section may be one of a pair of pipe sections In this embodiment, the collar seal is disposed in both pipe sections Generally, a sealing means is provided for sealing between the collar seal and an inner surface of each of the pipe sections. This sealing means comprises the sealing check valve means previously described which seals against one of the pipe sections. The sealing means may further comprise another sealing check valve means or a different type of seal, such as an O-ring, for sealing against the other of the pipe sections.

One method of assembling the pipe joint of the present invention comprises the steps of threading a first pipe section into a pipe coupling such that the pipe coupling extends from the pipe section, positioning a collar seal in the pipe section such that an annulus is formed between the collar seal and the pipe coupling, filling the annulus with liquid, threading a second pipe section into the coupling such that the second pipe section extends over an end of the collar seal, and providing check valve means for allowing liquid to escape from the annulus as the second pipe section is threaded into the coupling. The collar seal provides sealing engagement between the pipe sections and shoulders against an end of the first pipe section.

Numerous objects and advantages of the invention will become apparent as the following detailed description of the preferred embodiments is read in conjunction with the drawings which illustrate such embodiments.

· DESCRIPTION OF THE PREFERRED EMBODIMENTS

Figure 1:
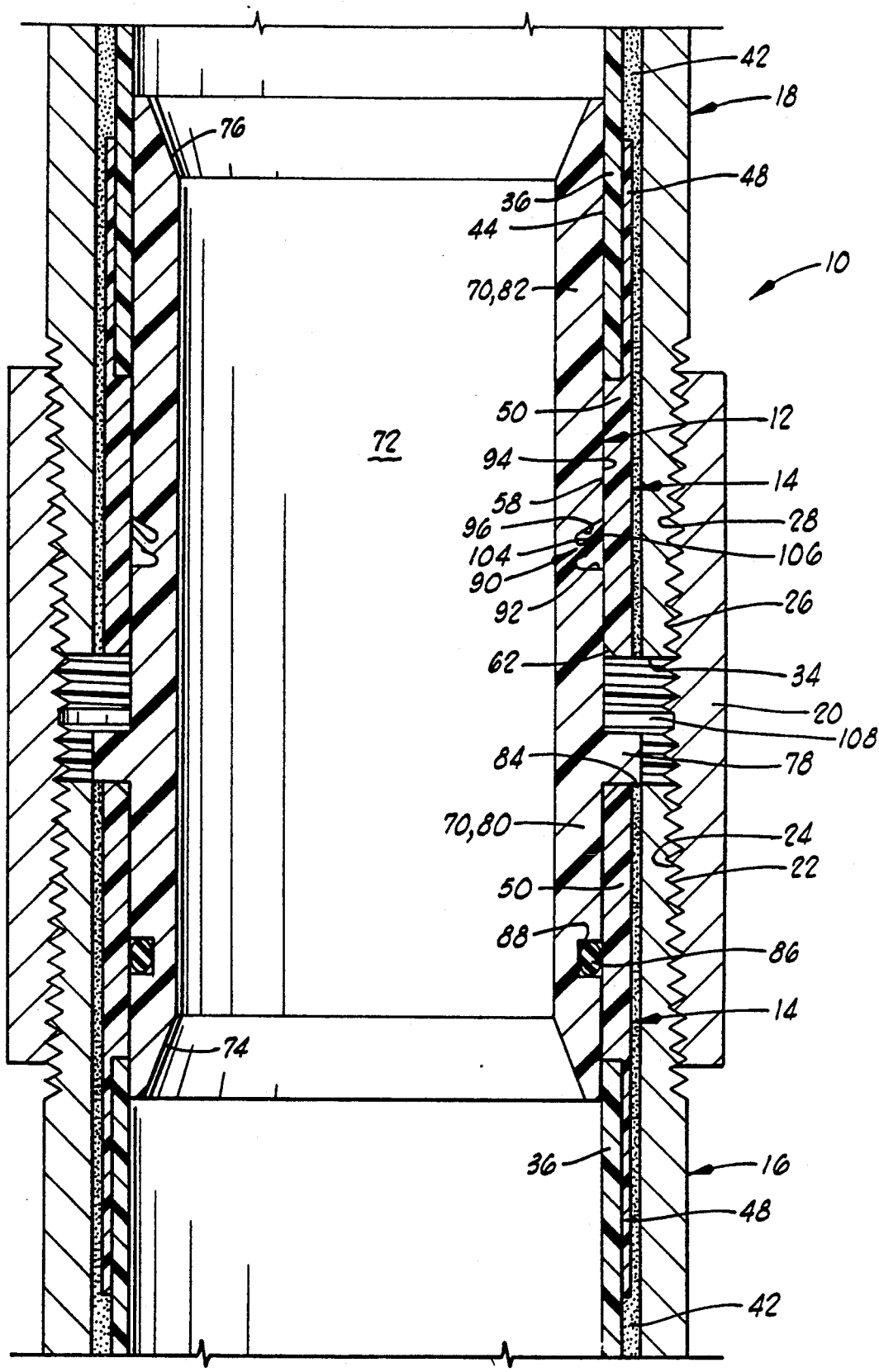
FIG. 1 is a longitudinal cross section of the lined pipe joint of the present invention.

Referring now to the drawings, and more particularly to FIG. 1, a first embodiment of the pipe joint of the present invention is shown and generally designated by the numeral 10. The major components of pipe joint 10 include a collar seal 12 and a pipe lining end 14.

Pipe joint 10 is illustrated as being formed by first and second pipe sections 16 and 18 threadingly engaged with a pipe fitting, such as a pipe collar or coupling 20. However, it should be understood that the pipe joint of the present invention is not intended to be limited to the connection of two threaded pipe sections with a pipe coupling. For example, the present invention may be incorporated into pipe joints which are joined using connections such as flanges, mechanically fitted friction joints (one pipe section end frictionally fitting over the other), clamped fittings, integral joints (in which the coupling is integral to the end of one pipe section), welded joints, and the like, as would be known to one skilled in the art in view of the disclosure contained herein. Further, the present invention may also be incorporated into pipe joints created where a pipe section is engaged into another type of pipe fitting, such as a tee, elbow, union, etc. The present invention can also be incorporated in a transition between a lined pipe section and an unlined fitting or pipe section.

The threaded engagement between pipe sections 16 and 18 and coupling 20 utilizes typically tapered pipe threads. That is, first pipe section 16 has a tapered external thread 22 thereon which engages a tapered internal thread 24 in coupling 20. Similarly, second pipe section 18 has a tapered external thread 26 thereon which engages a tapered internal thread on the opposite end of coupling 20.

Figure 2:
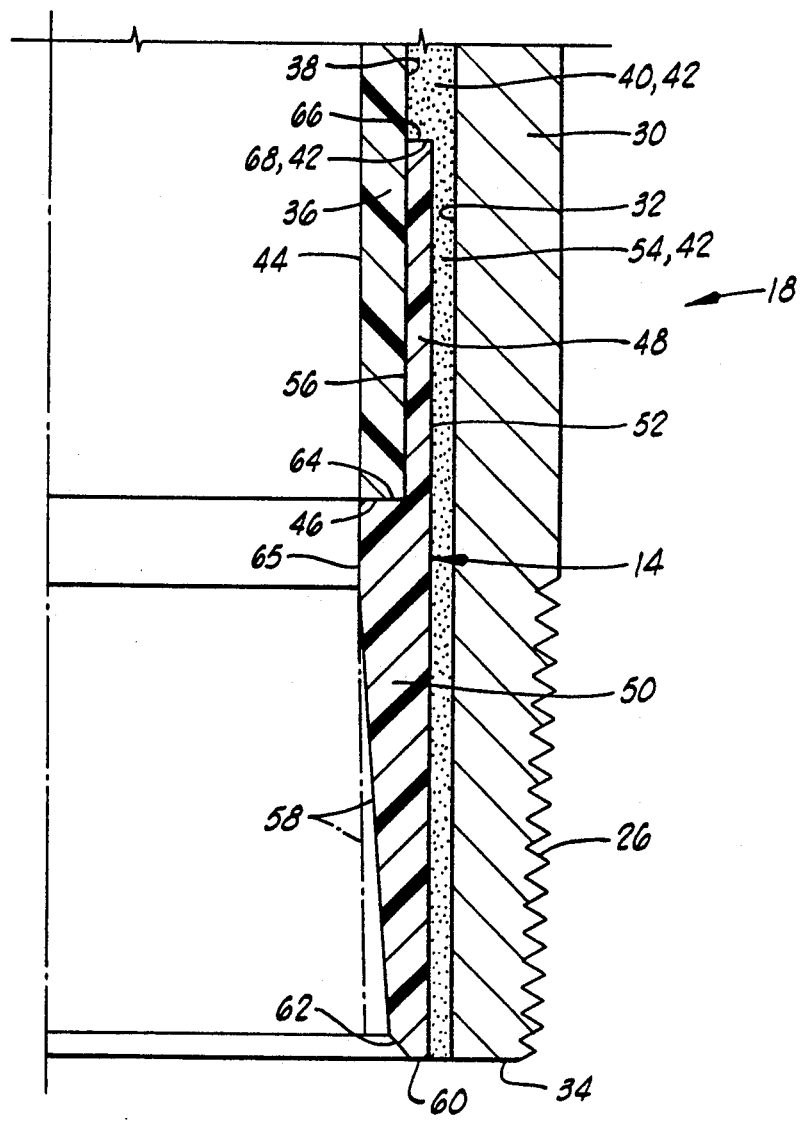
FIG. 2 is an enlarged cross section of a first embodiment of the pipe lining end of the pipe joint installed in a pipe section.

Referring now to FIGS. 1 and 2, the details of construction of second pipe section 18 will be discussed. It should be understood that first pipe section 16 as illustrated is usually substantially similar or identical to second pipe section 18, but different sizes of pipe may be used.

Pipe section 18 has an outer portion 30, preferably made of metal, on which external thread 26 is formed. Metal outer portion 30 defines a longitudinal bore 32 therethrough and has an end 34 adjacent to external thread 26. The outer portion 30 may be made of any suitable material, as would be known to one skilled in the art in view of the disclosure contained herein.

Disposed longitudinally within metal portion 30 is a substantially cylindrical liner 36, made of a corrosion resistant material. Liner 36 has an outer surface 38 which is spaced radially inwardly from bore 32 in metal portion 30 such that a first pipe annulus 40 is formed therebetween. Pipe annulus 40 is filled with a grout material 42 of a kind known in the art which holds liner 38 in place. Typical grout materials include hydraulic cement, cement with polymer, epoxy resins, and the like, all of which are collectively referred to as "grout" herein. Liner 36 defines a longitudinal bore 44 therethrough and has an end 46.

Lining end 14 is disposed adjacent to end 34 of metal portion 30 and also adjacent to end 46 of liner 36. Lining end 14 has a sleeve portion 48 and an enlarged end portion 50. Preferably, an outer surface 52 of lining end 14 is spaced radially inwardly from bore 32 in metal portion 30 such that a thinner second pipe annulus 54 is defined therebetween which is also filled with grout 42. Grout 42 in second pipe annulus 54 may be considered an extension of the grout in thicker pipe annulus 40 and thus contiguous therewith.

Lining end 14 defines a substantially cylindrical bore 56 in sleeve portion 48 which is sized for close relationship with outer surface 38 of liner 36. Preferably, but not by way of limitation, bore 56 in lining end 14 is chemically bonded or otherwise affixed to outer surface 38 of liner 36.

Preferably, end portion 50 of lining end 14 defines a tapered bore 58 therein. Tapered bore 58 tapers radially outwardly in the direction of end 60 of lining end 14. End 60 is shown generally aligned with end 34 of metal portion 30, but this is not essential. A chamfer 62 interconnects end 60 and tapered bore 58. It will also be seen that bore 56 and tapered bore 58 in lining end 60 are sized such that an annular shoulder 64 is defined therebetween and generally abuts end 46 of liner 36.

Tapered bore 58 is exaggerated in FIG. 2 for illustration purposes. Actually, the taper in tapered bore 58 is relatively small. The length of end portion 50 of lining end 14 is preferably approximately the same as the length of external thread 26 on metal portion 30. More preferably, to allow rethreading of the pipe sections 16,18 as discussed below, the length of the tapered bore 58 is approximately the same as the length of the external thread 26 on the metal portion 30 and the non-tapered bore portion 65 extends into the pipe section 18 beyond the threads 26. As pipe section 18 is threaded into pipe coupling 20, the tapered threaded engagement may cause the threaded end of the pipe section to be deflected slightly radially inwardly. As will be further described herein, this deflection may cause problems with improved collar seal 12. The taper in tapered bore 58 is sized and aligned to compensate for any radially inward deflection of the end of pipe section 18 Thus, if there is deflection as pipe section 18 is threaded into pipe coupling 20, end portion 50 of lining end 14 will also be deflected radially inwardly so that tapered bore 58 is correspondingly deflected radially inwardly as indicated by the phantom lines in FIG. 2.

In the preferred embodiment, when pipe section 18 is completely engaged with pipe coupling 20, any deflection of tapered bore 58 in lining end 14 is such that the minimum inside diameter along any portion of tapered bore 58 is still at least as large as bore 44 in liner 36. When drawn to the scale of FIG. 1, the remaining taper, if any, of tapered bore 58 is not visually perceptible. The tapered bore 58 is not necessary with connections which do not radially inwardly deflect the ends of the pipe section, such as flanged fittings, clamped fittings, welded ends, and the like.

Preferably, the end portion 50 includes a non-tapered bore portion 65 which extends between shoulder 64 and tapered bore 58. The non-tapered bore portion 65 strengthens shoulder 64 and the connection of the end portion 50 to the liner 36. The non-tapered portion 65 also allows the lining end to be rebored and retapered if the pipe section is rethreaded. An advantage of the present invention is that the pipe sections 16,18 can be rethreaded, i.e., if the existing threads become worn or damaged, a longitudinally extending portion can be cut off the end of the pipe section 16,18 and new threads cut. Since the threads are tapered, when the portion is cut from the end of the pipe section the new threads will be cut into the metal outer portion of the pipe section deeper than (on a taper lying below) the previously existing threads. After the new threads are cut, the end portion 50 can be retapered and rechamfered to properly align with the new threads, as discussed above The prior lined pipes known to the inventor could not be rethreaded, as they utilized flared ends to anchor the liner in the pipe section and the flared ends would be cut off in the rethreading process.

Lining end 14 also has an end or shoulder 66 opposite end 60 thereof. Because pipe annulus 40 is filled with grout 42, end 66 of lining end 14 abuts a shoulder 68 formed by grout 42. As previously mentioned, when heat is applied, materials used for forming liner 36 may have a tendency to shrink, particularly longitudinally, thus causing liner 36 to contract longitudinally within metal pipe portion 30. This is particularly true when the liner 36 is made of extruded plastic and the pipe section is exposed to temperatures above the heat distortion temperature of the extruded plastic because of the longitudinal or tensile stresses created in the liner by the extrusion process. The above-mentioned chemical bond between lining end 14 and liner 36 is preferably stronger than the internal stresses in liner 36 which cause such contraction. Also, preferably, the shear strength and tensile strength of the lining end 14 are greater than the tensile strength of the liner 36 and than the internal stresses which cause contraction of the liner 36. Therefore, since end 66 of lining end 14 abuts shoulder 68 formed by grout 42, and because the grout itself does not shrink significantly relative to the metal outer portion 30 to which the grout is normally frictionally or chemically bonded, lining end 14 holds liner 36 such that it cannot shrink and contract longitudinally. The abutment of the lining ends 14 with the grout 42 also causes the liner 36 to stretch with the metal outer portion 30 when the pipe section 16,18 is subjected to tensile loadings, as is common in vertical installations such as in injection and disposal wells. The grouting material 42 should also be selected to have sufficient tensile and compressive strength to withstand the forces exerted by the line 36 on the grouting material 42.

Figure 4:
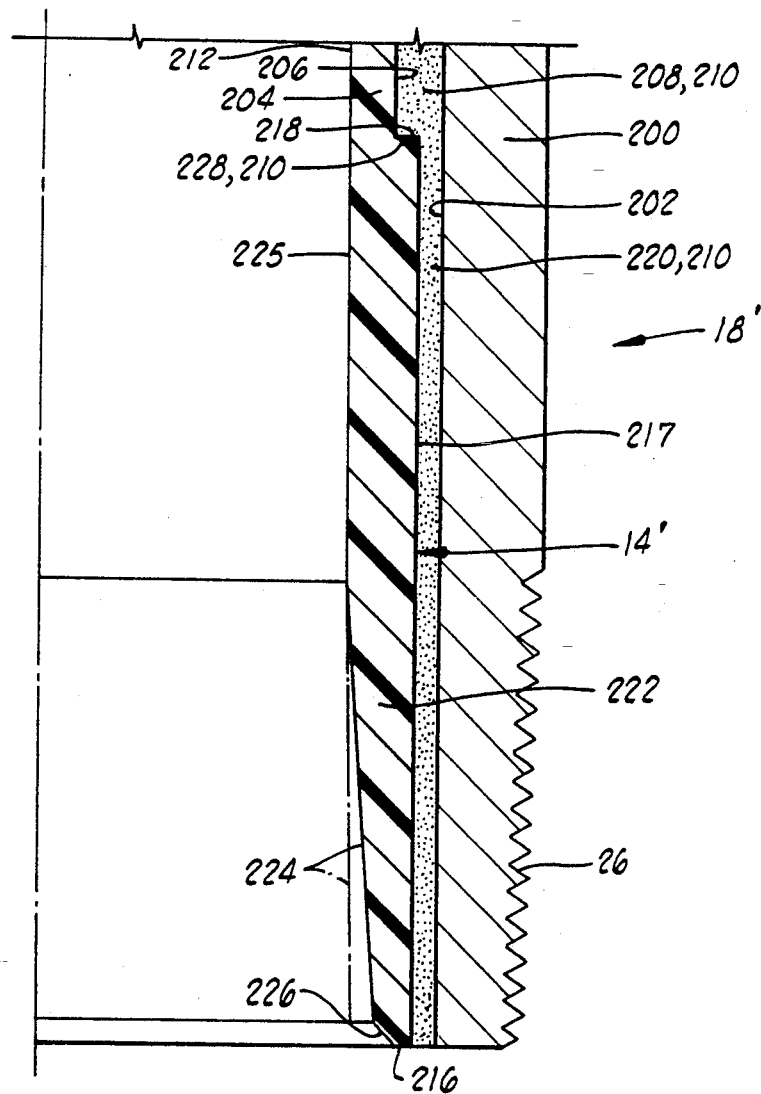
FIG. 4 illustrates an enlarged cross section of an alternate embodiment of the pipe lining end installed in a pipe section.

Referring now to FIG. 4, an alternative embodiment lining end 14' is shown in the end of a pipe section 18'. In this embodiment, lining end 14' is integrally formed with the pipe liner.

Pipe section 18' has a metal outer portion 200 on which external thread 26 is formed. Metal outer portion 200 is substantially identical to metal portion 30 in the first embodiment and defines a longitudinal bore 202 therethrough.

Disposed longitudinally within metal portion 200 is a substantially cylindrical liner 204, made of a corrosion resistant material. Liner 204 has a first outer surface 206 which is spaced radially inwardly from bore 202 in metal portion 200 such that a first pipe annulus 208 is formed therebetween First pipe annulus 208 is filled with a grout material 210 of a kind known in the art which holds liner 204 in place. Grout material 210 is substantially identical to grout material 42 previously described. Liner 204 defines a longitudinal bore 212 therethrough and has an end 216.

Lining end 14' is an enlarged portion at the end of liner 204. That is, lining end 14' of liner 204 has a second outer surface 217 which is larger than first outer surface 206. An annular shoulder 218 extends between first outer surface 206 and second outer surface 216.

Outer surface 217 is spaced radially inwardly from bore 202 in metal portion 200 such that a thinner second pipe annulus 220 is defined therebetween which is also filled with grout 210. Grout 210 in second pipe annulus 220 may be considered an extension of the grout in thicker first pipe annulus 208 and thus contiguous therewith.

An end portion 222 of lining end 14' preferably defines a tapered bore 224 and non-tapered bore portion 225 which are substantially identical in structure and function to tapered bore 58 and non-tapered bore portion 65 in first embodiment lining end 14. Preferably, a chamfer 226 interconnects tapered bore 224 with end 216. As with tapered bore 58 in FIG. 2, tapered bore 210 is exaggerated in FIG. 4 for illustration purposes. When pipe section 18' is threaded into a pipe coupling, tapered bore 210 may be deflected radially inwardly as indicated by the phantom lines in FIG. 4. As with tapered bore 58, the tapered bore 210 is not necessary with connections which do not radially inwardly deflect the ends of the pipe sections.

Because pipe annulus 208 is filled with grout 210, shoulder 21B of lining end 14' abuts a shoulder 228 formed by grout 210. As with the first embodiment, when heat is applied to liner 204, materials used for forming the liner may have a tendency to shrink which causes liner 204 to contract longitudinally within metal pipe portion 200. Since shoulder 218 of lining end 14' abuts shoulder 228 formed by grout 210, and because the grout itself does not shrink significantly with respect to the metal outer portion 30, lining end 14' prevents longitudinal contraction of the rest of liner 204. The embodiment of FIG. 4 is particularly suitable for fittings, such as tees, elbows, unions, and the like, for which the entire liner 204 with liner ends 14' may be integrally machined from a piece of liner material and inserted into the fitting.

Figure 3:
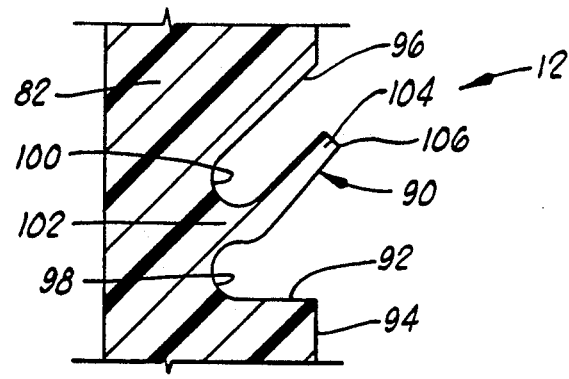
FIG. 3 shows an enlarged cross section of one embodiment of the sealing check valve means on the collar seal of the lined pipe joint.

Referring now to FIGS. 1 and 3, the details of improved collar seal 12 will be discussed. Collar seal 12 represents an improvement on the collar seal disclosed in U.S. Pat. No. 4,507,842, previously mentioned, and a copy of this prior patent is incorporated herein by reference.

Collar seal 12 is illustrated as comprising a hollow, open-ended, substantially cylindrical tube 70 defining a central opening 72 therethrough and having first and second internal edges 74 and 76 which are preferably beveled and chamfered to reduce turbulence in the fluid passing through pipe joint 10.

An external ridge or ledge 78 extends radially outwardly from the outer surface of cylindrical tube 70 and is preferably molded to the cylindrical tube or formed integrally therewith. Thus, ridge 78 divides tube 80 into first and second tube portions 80 and 82 which define first and second edges 74 and 76, respectively. First tube portion 80 is adapted to fit within first pipe section 16, and second tube portion 82 is adapted to fit within second pipe section 18. Ridge 78 is adapted to rest on longitudinal end 84 of first pipe section 16.

Although tube 70 is illustrated as a cylindrical tube having substantially constant inside and outside diameters, it should be understood that first and second tube portions 80 and 82 may be of different sizes to accommodate different sizes of pipe sections 16 and 18, respectively. Also, a pipe section may be connected to a pipe fitting such as a tee, elbow, union, etc. Collar seal 12 may also be adapted so that tube portions 80,82 have different diameters depending upon the size of pipe and the pipe fitting. Thus, it is not intended that the invention be limited to only the embodiment illustrated having cylindrical tube 70.

A sealing means is provided for sealing between first tube portion 80 of collar seal 12 and first pipe section 16 and for sealing between second tube portion 82 of collar seal 12 and second pipe section 18. In the illustrated embodiment, this sealing means comprises in part an O-ring 86 positioned in an O-ring groove 88 defined in first tube portion 80. In a manner known in the art, O-ring 86 thus provides sealing engagement between first tube portion 80 and first pipe section 16.

As described thus far, collar seal 12 is substantially similar to the prior art collar seal described in U.S. Pat. No. 4,507,842. A major difference between collar seal 12 and the prior art collar seal is in the sealing means 90 which provides sealing engagement between second tube portion 82 of collar seal 12 and second pipe section 18. Referring now also to FIG. 3, the improved sealing means 90 will be discussed. Sealing means 90 may also be referred to as a sealing check valve means 90.

Second tube portion 82 of collar seal 12 has an annular first shoulder 92 extending radially inwardly from outer surface 94 thereof Spaced from first shoulder 92 is a tapered second shoulder 96 which also extends radially inwardly from outer surface 94. Tapered shoulder 96 angles radially outwardly in the direction of second edge 76 of collar seal 12 and away from first shoulder 92 and ridge 78. At the root of shoulder 92 is a curvilinear groove 98, and at the root of tapered shoulder 96 is another curvilinear groove 100 which is spaced from groove 98 such that a radially outwardly extending ring portion 102 is defined therebetween. Extending angularly from ring portion 102 and integrally formed therewith is a flexible lip 104 It will be seen that lip 104 extends generally parallel to tapered shoulder 96 and thus angles in the direction of second edge 76 of collar seal 12 and away from first shoulder 92 and ridge 78. Lip 104 extends radially outwardly such that at least a radially outermost edge 106 thereon has a free diameter greater than that of outer surface 94 of tube 70 and also greater than the diameter of the bore against which the lip 104 is to seal, such as bore 44 in liner 36 or bore 212 in liner 204. The free diameter of edge 106 of lip 104 is the diameter before installation of collar seal 12 in pipe joint 10.

Referring again to FIG. 1, outer surface 94 is preferably adapted to fit closely within tapered bore 58 of lining end 14 and bore 44 in liner 36. In the second embodiment pipe section 18', outer surface 94 of collar seal 12 is preferably adapted to fit closely within tapered bore 224 of lining end 14' and bore 212 in liner 204. In the preferred embodiment, outer edge 106 of lip 104 has a free diameter greater than the maximum inside diameter of tapered bore 58 or 224, at least when the tapered bore is inwardly deflected as described above, such that flexible lip 104 will always be deflected somewhat toward tapered shoulder 96 when collar seal 12 is positioned in pipe joint 18 or 18'. The flexibility of lip 104 inherently biases the lip toward tapered bore 58 or 224 in lining end 14 such that edge 106 of lip 104 is maintained in sealing engagement with tapered bore 58 or 224. It will be seen by those skilled in the art that lip 104 is increasingly forced against tapered bore 58 or 224 as pressure within pipe section 18 or 18' is increased.

Gas can permeate a liner 36 or 204 made of plastic and similar materials and pass from the interior of pipe section 18,18' into grout 42 or 210 and thereby be in communication with coupling annulus 108 defined between first and second pipe sections 16 and 18 within pipe coupling 20. Without sealing check valve means 90, such gas is trapped in coupling annulus 108 and in the grout 42,210 and can expand and implode or deform liner 36 or 204 radially inwardly when the pipsection 18,18' is depressurized (since the gas trapped in annulus 108 and grout 42,210 may be at a much higher pressure than the interior of depressurized pipe section 18,18'), thus tearing the liner away from grout 42 or 210 which is obviously an undesirable result. Sealing check valve means 90 provides a solution to this problem because angled lip 104 will act as a check valve and allow gas or liquid trapped in coupling annulus 108 at a higher pressure to flow into the lower pressure of the interior of the depressurized pipe section 18,18'. That is, the pressure acts on flexible lip 104 to deflect it toward tapered shoulder 96, thus allowing the gas or liquid to pass around outer edge 106 and into the interior of pipe section 18 or 18'. The check valve action of the lip 104 prevents fluids from flowing from the interior of pipe section 18,18' through sealing check valve means 90 into the annulus 108. Although sealing check valve means 90 is illustrated only on second tube portion 80 of collar seal 12, it could also be incorporated in first tube portion 80, thereby eliminating O-ring 86.

Sealing means 90 is preferably on the upstream side of pipe joint 10 as shown in FIG. 1. Thus, ridge 78 will not impair the flow of fluid from annulus 108 toward lip 104 when the pressure drop across the collar seal 12 or other forces move the ridge 78 to the downstream side of annulus 108, as shown in FIG. 1.

Figure 5:
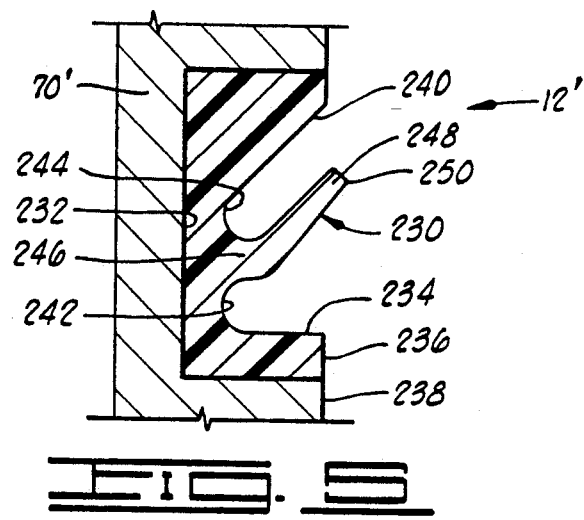
FIG. 5 is an enlarged cross section of an alternative embodiment of the sealing check valve means.

Referring now to FIG. 5, additional details of a second embodiment collar seal 12' will be discussed. First embodiment collar seal 12 has sealing check valve means 90 formed integrally therewith. Second embodiment collar seal 12 has a separate sealing check valve means 230 made of a flexible or resilient material and disposed in a seal groove 232 formed in a tube 70'. In the preferred embodiment the groove 232 is machined into the tube 70' and the sealing check valve means 230 is glued or bonded into the groove As with tube 70 in first embodiment collar seal 12, second embodiment tube 70' may have ends of different sizes to accommodate different sizes of pipes and/or fittings.

Preferably, sealing check valve means 230 is in the form of a ring which fits within groove 232, and sealing check valve means 230 has an annular first shoulder 234 extending radially inwardly from outer surface 236 thereof. Outer surface 236 is substantially aligned with an outer surface 238 of tube 70' and thus may be considered an extension thereof. Spaced from first shoulder 234 is a tapered second shoulder 240 which also extends radially inwardly from outer surface 236. Tapered shoulder 240 angles radially outwardly away from first shoulder 234. At the root of shoulder 234 is a curvilinear groove 242, and at the root of tapered shoulder 240 is another curvilinear groove 244 which is spaced from groove 242 such that a radially outwardly extending ring portion 246 is defined therebetween. Extending angularly from ring portion 246 and integrally formed therewith is a flexible lip 248. It will be seen that lip 248 extends generally parallel to tapered shoulder 240 and thus angles away from first shoulder 92. Lip 248 extend radially outwardly such that at least an outermost edge 250 thereon has a free diameter greater than that of outer surface 236 or outer surface 238 and also greater than the diameter of the bore against which the lip 248 is to seal, such as bore 44 in liner 36 or bore 212 in liner 204. As with the first embodiment, the free diameter of edge 250 of lip 248 is the diameter before installation of collar seal 12' in the pipe joint.

The installation of collar seal 12' with separate sealing check valve means 230 is substantially identical to that of collar seal 12 with integral sealing check valve means 90. An advantage of separate sealing check valve means 230 is that the check valve means 230 on a collar seal 12' may be replaced to change the free diameter of lip 248 and to thereby custom fit the collar seal 12' to pipe sections 16,18 and fittings having bores of loosely regulated diameters.

While only a single sealing check valve means 90 or 230 has been shown in the described embodiments, more than one sealing check valve means may be used on either or both ends of tube 70 or 70'.

Figure 6:
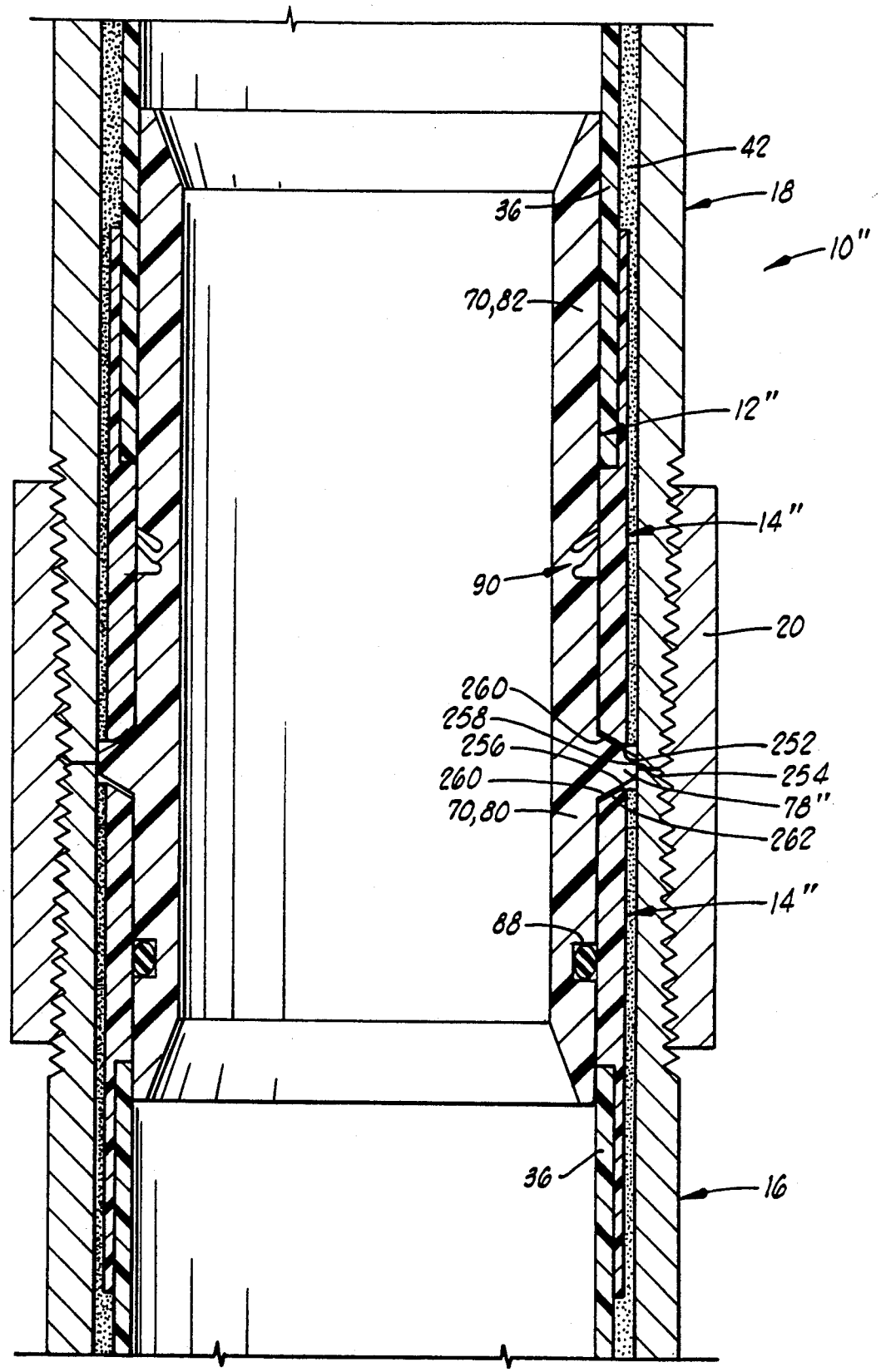
FIG. 6 shows a longitudinal cross section of an additional embodiment of the pipe joint of the present invention.

Referring now to FIG. 6, still another embodiment 10" of the present invention is shown. Embodiment 10" is almost the same as that shown in FIG. 1 except that pipe sections 16 and 18 are threaded completely into coupling 20 so that their facing longitudinal ends abut one another. If this occurred in the embodiment shown in FIG. 1, ridge 78 of collar seal 12 would either be crushed between pipe sections 16 and 18 or would prevent the pipe sections from being properly engaged with coupling 20. Thus, in embodiment 10" a modified collar seal 12" is shown interacting with modified lining ends 14".

In embodiment 10", end 252 of lining end 14" is spaced longitudinally inwardly from end 254 of pipe section 18, and end 256 of the other lining end 14" is spaced longitudinally inwardly from end 258 of pipe section 16. Lining ends 14" have enlarged chamfers 260 adjacent to the longitudinal ends thereof.

Collar seal 12" has a modified radially outwardly extending ledge or ridge 78" which has chamfered sides 262 thereon which are generally parallel to chamfers 260 in lining ends 14". As seen in FIG. 6, when pipe sections 16 and 18 are completely threaded into coupling 20, ridge 78" fits within lining ends 14" without interference.

With regard to embodiment 10", it should be understood that these modifications embodied in collar seal 12" and lining ends 14" could also be incorporated in situations where the check valve sealing means is a separate component from collar seal 12", where lining ends 14" are integrally formed with the pipe liner, and where other types of connections are used to connect the pipe sections 16,18, such as flanges, clamped fittings, and equivalent connections. For example, the modifications shown in FIG. 6 could be incorporated into the embodiment shown in FIGS. 4 and 5 and not just the embodiment of FIGS. 1-3. The collar seal 12,12', or 12" may be used with unlined pipe and with coated pipe to prevent fluids contained within the pipe sections 16,18 from entering annulus 108 and damaging coupling 20 (or other fittings) and from getting underneath the coating of coated pipe.

The materials for collar seals 12, 12' and 12" and lining ends 14, 14' and 14" may be made of a variety of materials. For example, but not by way of limitation, materials may include polyvinyl chloride (PVC), chlorinated polyvinyl chloride (CPVC), double chlorinated polyvinyl chloride (CCPVC), tetrafluorethylene, stainless steel, fiberglass, or many other corrosion resistant materials.

With regard to the assembly of the apparatus of the present invention, the embodiment shown in FIG. 1 will be discussed. It should be understood that other embodiments and combinations thereof may be assembled in substantially the same manner.

Pipe coupling 20 is engaged with first pipe section 16 and first tube portion 80 of collar seal 12 is inserted into first pipe section 16 so that ridge 78 abuts end 84 of the first pipe section. It will be seen that collar seal 12 and pipe coupling 20 thus form an open annulus therebetween. Preferably, but not by way of limitation, this annulus is filled with a non-corrosive liquid. If the pipe sections 16,18 are vertically oriented as shown in FIG. 1, the non-corrosive liquid may simply be poured into the annulus If the pipe sections 16,18 are in an orientation such that the annulus will not hold a free-flowing liquid, such as a horizontal orientation, a more viscous fluid or liquid such as a grease may be used or a stabbing cone or the like may be placed around the outside of the pipe sections 16,18 and annulus to retain a free-flowing liquid, as would be known to one skilled in the art in view of the disclosure contained herein.

Second pipe section 18 is then positioned over second tube portion 82 of collar seal 12. Second tube portion 82 preferably extends beyond pipe coupling 20 so that second pipe section 18 is aligned by collar seal 12, facilitating bayonetting together of the pipe sections. As chamfer 62 engages flexible lip 104, it will gradually force it radially inwardly to its sealing position as tapered bore 78 is moved over flexible lip 104. Second pipe section 18 is then threadingly engaged with pipe coupling 20.

As pipe section 18 is threaded into coupling 20, the liquid in the annulus will be displaced. The liquid will fill any voids in the annulus 108 and excess liquid will be discharged from annulus 108 around flexible lip 104 of sealing check valve means 90. Thus, when pipe joint 10 is completely made up, annulus 108 is filled with liquid. Because the liquid fills voids in the annulus 108, any radially outward deflection of the collar seal 12,12',12' into these voids when the interior of the pipe sections 16,18 and collar seal 12,12',12" are pressurized is minimized or prevented. The inventor has experience with prior collar seals (such as disclosed in U.S. Pat. No. 4,507,842) which have been molded into the threads on the inside of a coupling similar to coupling 20 by the pressure inside the collar seals. The liquid filled annulus 108 prevents such damage to the collar seal 12,12',12".

As previously described, tapered bore 58 compensates for any radially inward deflection of second pipe section 18 as a result of the threaded engagement. Because tapered bore 58 is preferably at least as large as bore 44 in liner 36 at all times and tube portions 80,82 of collar seal 12 are preferably slightly smaller in diameter than bore 44, tapered bore 58 in lining end 14 will not be forced into gripping engagement with collar seal 12 and thus cannot interfere with the sealing or check valve action of lip 104 of sealing check valve means 90, e.g., the contact of the tapered bore 58 with the collar seal 12 will not seal the lip 104 between shoulders 92,96 in such a manner as to prevent the check valve action of the lip 104.

Although the invention has been described with respect to the joint formed at one end of a pipe section 16,18, it is intended to be understood that the collar seal 12,12',12' and lining end 14,14',14" will normally be provided at each open end of a lined pipe section and of a lined fitting, such as a tee, elbow, union, or the like. It is also intended to be understood that the collar seal 12,12',12" may be used to seal a joint between an unlined pipe section and an unlined fitting, such as a tee, elbow, union, or the like.

It will be seen, therefore, that the improved pipe joint with collar seal and lining end of the present invention is well adapted to carry out the ends and advantages mentioned as well as those inherent therein. While presently preferred embodiments of the apparatus have been shown for the purposes of this disclosure, numerous changes in the arrangement and construction of parts may be made by those skilled in the art. All such changes are encompassed within the scope and spirit of the appended claims.

What is claimed is:

1. A collar seal for use in a pipe joint of the type having a pipe section, said collar seal comprising:
   a cylindrical tube having an outer surface and a central opening defined therethrough;
   a ridge extending radially outwardly from said outer surface and positionable adjacent to an end of said pipe section; and sealing check valve means for sealing between said tube and said pipe section when pressure within said pipe section is greater than pressure outside said tube and allowing relief of said pressure outside said tube when said pressure outside said tube is greater than said pressure within said pipe section 2. The collar seal of claim 1 wherein said sealing check valve means comprises a flexible lip extending from said tube and toward an inner surface of said pipe section.

3. The collar seal of claim 2 wherein said lip extends angularly away from said ridge.

4. The collar seal of claim 2 wherein said lip has a radially outer edge having a free diameter greater than said outer surface of said tube.

5. The collar seal of claim 2 wherein:
said sealing check valve means further comprises:
first shoulder extending radially inwardly from said outer surface of said tube; and
a second shoulder extending radially inwardly from said outer surface and spaced from said first shoulder; and
said lip is disposed between said shoulders.

6. The collar seal of claim 5 wherein:
said second shoulder is a tapered shoulder; and
said lip is substantially parallel to said second shoulder.

7. The collar seal of claim 2 wherein said lip is inherently biased toward said inner surface of said pipe section when engaged therewith.

8. The collar seal of claim 1 wherein said sealing check valve means is integrally formed with said tube.

9. A pipe section comprising:
an outer portion having an end;
a liner having a first outer surface spaced radially inwardly from said outer portion and an end spaced longitudinally inwardly from the end of said outer portion;
grout disposed between said outer portion and said liner for holding said liner in said outer portion; and
a lining end at an end of said liner and having a second outer surface of larger diameter than said first outer surface, said second outer surface comprising a shoulder abutting said grout such that longitudinal contraction of said liner relative to said pipe section is prevented, said shoulder being spaced longitudinally inwardly from said end of the outer portion said lining end extending between the end of said liner and the end of said outer portion.

10. The pipe section of claim 9 wherein said second outer surface is spaced radially inwardly from said outer portion; and
further comprising additional grout disposed between said outer portion of said second outer surface.

11. The pipe section of claim 10 wherein said grout between said outer portion and said second outer surface is contiguous with said grout between said outer portion and said liner.

12. The pipe section of claim 9 wherein said liner and said lining end are integrally formed.

13. The pipe section of claim 9 wherein the longitudinal distance from said shoulder to the opposite longitudinal end of said lining end is at least twice the thickness of said liner.

14. The pipe section of claim 9 wherein said second outer surface of said lining end extends longitudinally along the full length of the lining end so that the shear strength and tensile strength of the lining end are greater than the tensile strength of the liner.

15. A pipe section comprising:
an outer portion;
a liner having an outer surface spaced radially inwardly from said outer portion;
grout disposed between said outer portion and said liner for holding said liner in said outer portion; and
a lining end at an end of said liner and comprising a shoulder abutting said grout such that such longitudinal contraction of said liner relative to said pipe section is prevented, and wherein:
there is radially inward deflection of the pipe section when the pipe section is engaged with a pipe fitting; and
said lining end defines an outwardly tapered bore therein, said tapered bore being sized such that a minimum inside diameter thereof is at least as large as an inside diameter of said liner after said deflection.

16. The pipe section of claim 15 wherein:
said outer portion has a pipe thread defined thereon; and
a length of said tapered bore is substantially the same as the length of said pipe thread.

17. A pipe section comprising:
an outer portion;
a liner having an outer surface spaced radially inwardly from said outer portion;
grout disposed between said outer portion and said liner for holding said liner in said outer portion; and
a lining end at an end of said liner and comprising a shoulder abutting said grout such that longitudinal contraction of said liner relative to said pipe section is prevented, and wherein said lining end defines a chamfer at a longitudinal end thereof.

18. A pipe section comprising:
an outer portion having an end;
a liner having an outer surface spaced radially inwardly from said outer portion and an end spaced longitudinally inwardly from the end of said outer portion;
grout disposed between said outer portion and said liner for holding said liner in said outer portion; and
a lining end at an end of said liner and comprising a shoulder abutting said grout such that longitudinal contraction of said liner relative to said pipe section is prevented, said lining end being a separate component from said liner and extending between the end of said liner and the end of said outer portion and further comprising:
a sleeve portion disposed around an end of said liner, an end of said sleeve portion forming said shoulder; and
an end portion extending from said sleeve portion and abutting an end of said liner.

19. The pipe section of claim 18 wherein said lining end is chemically bonded to said liner.

20. The pipe section of claim 18 wherein said lining end is made of a plastic material.

21. A pipe joint comprising:
a pipe section comprising:
a metal outer portion;
a liner disposed in said outer portion;
grouting material between said liner and outer portion for holding said liner in place within said outer portion; and a lining end extending from said liner and comprising a shoulder abutting said grout such that longitudinal contraction of said liner within said outer portion is prevented;

a collar seal extending into an end of said pipe section;

a pipe fitting engaged with said pipe section such that an annulus is defined between said collar seal and said fitting; and sealing check valve means for sealing between said collar seal and said pipe section when pressure within said pipe section is greater than pressure in said annulus and allowing relief of pressure in said annulus when said pressure in said annulus is greater than the pressure within said pipe section.

22. The pipe joint of claim 21 wherein said sealing means comprises sealing check valve means for sealing between said collar seal and said pipe section when pressure within said pipe section is greater than pressure in said annulus and allowing relief of pressure in said annulus when said pressure in said annulus is greater than the pressure within said pipe section.

23. The pipe joint of claim 21 wherein said sealing check valve means comprises a flexible lip extending from said collar seal and angularly toward an inner surface of said pipe section in a direction away from said annulus.

24. The pipe joint of claim 21 wherein said sealing check valve means is integrally formed with said collar seal.

25. The pipe joint of claim 21 wherein said lining end has an outer surface spaced radially inwardly from said outer portion; and further comprising additional grout disposed between said lining end and said outer portion.

26. The pipe joint of claim 21 wherein said lining end is integrally formed with said liner.

27. The pipe joint of claim 21 wherein said lining end is a separate component from said liner and comprises:

a sleeve portion disposed around an end of said liner, an end of said sleeve portion forming said shoulder abutting said grout; and an end portion extending from said sleeve portion and abutting an end of said liner.

28. The pipe joint of claim 27 wherein said lining end is chemically bonded to said liner.

29. The pipe joint of claim 21 wherein said annulus is filled with a liquid.

30. The pipe section of claim 21 wherein:

said pipe fitting is a pipe coupling;

said pipe section is one of a pair of pipe sections engaged with said pipe coupling;

the lining end in each of said pipe sections is spaced longitudinally inwardly from facing ends of said pipe sections, thereby creating a space between the lining ends when the pipe sections are engaged; and said collar seal has a radially outer ridge thereon positioned between said ends of said lining ends such that when said pipe sections are engaged with said pipe coupling such that said facing ends of said pipe sections abut one another, said ridge extends into said space between said lining ends.

31. The pipe joint of claim 30 wherein:

said lining ends have chamfered surfaces at longitudinal ends thereof; and said ridge has chamfered sides adapted for matching said chamfered surfaces.

32. A method of assembling a pipe joint comprising the steps of:

threading a first pipe section into a pipe coupling such that the pipe coupling extends from the pipe section;

positioning a collar seal in said pipe section such that an annulus is formed between said collar seal and said pipe coupling, said collar seal providing sealing engagement between said pipe section and shouldering against an end thereof;

filling said annulus with liquid;

threading a second pipe section into said coupling such that said second pipe section extends over an end of said collar seal; and providing check valve means for allowing liquid to escape from said annulus as said second pipe section is threaded into said coupling.

* * * * *

UNITED STATES PATENT AND TRADEMARK OFFICE
CERTIFICATE OF CORRECTION

PATENT NO. : 5,282,652
DATED : February 1, 1994
INVENTOR(S) : Robert M. Werner

It is certified that error appears in the above-indentified patent and that said Letters Patent is hereby corrected as shown below:

Column 8, line 2, change "21B" to --218--.

Column 13, claim 10, line 55, change "of" to --and--.

Signed and Sealed this

Thirtieth Day of August, 1994

Attest:

BRUCE LEHMAN

*Attesting Officer*      *Commissioner of Patents and Trademarks*